US007756197B1

(12) United States Patent
Ferguson et al.

(10) Patent No.: US 7,756,197 B1
(45) Date of Patent: Jul. 13, 2010

(54) BUILT IN SELF TEST (BIST) FOR HIGH-SPEED SERIAL TRANSCEIVERS

(75) Inventors: Kenneth William Ferguson, Burnaby (CA); Paul Laprise, Burnaby (CA); Chris Siu, Vancouver (CA)

(73) Assignee: PMC-Sierra, Inc., Santa Clara, CA (US)

( * ) Notice: Subject to any disclaimer, the term of this patent is extended or adjusted under 35 U.S.C. 154(b) by 1212 days.

(21) Appl. No.: 10/998,090

(22) Filed: Nov. 24, 2004

Related U.S. Application Data (60) Provisional application No. 60/525,170, filed on Nov. 26, 2003.

(51) Int. Cl.
H04B 3/46 (2006.01)
H04B 17/00 (2006.01)
H04Q 1/20 (2006.01)

(52) U.S. Cl. ...................................... 375/224
(58) Field of Classification Search .................. 375/222, 375/223, 224, 229
See application file for complete search history.

(56) References Cited

U.S. PATENT DOCUMENTS

| 4,931,800 | A * | 6/1990 | Ward .......................... 342/162 |
| 5,386,590 | A | 1/1995 | Dolan |
| 6,272,465 | B1 * | 8/2001 | Hewitt et al. ................. 704/258 |
| 6,397,042 | B1 | 5/2002 | Prentice et al. |
| 6,571,393 | B1 | 5/2003 | Ko et al. |
| 6,573,948 | B1 * | 6/2003 | Limberg ...................... 348/614 |
| 2002/0030517 | A1 * | 3/2002 | Kurisu et al. ................. 327/108 |
| 2002/0161806 | A1 * | 10/2002 | Shaikh ......................... 708/300 |
| 2003/0021340 | A1 * | 1/2003 | McElroy et al. ............. 375/229 |
| 2003/0072363 | A1 * | 4/2003 | McDonald et al. .......... 375/232 |
| 2003/0083583 | A1 * | 5/2003 | Kovtun et al. ................ 600/509 |
| 2003/0112887 | A1 * | 6/2003 | Sang et al. ................... 375/285 |
| 2004/0268190 | A1 * | 12/2004 | Kossel et al. ................ 714/704 |
| 2005/0095988 | A1 * | 5/2005 | Bereza et al. ............. 455/67.14 |
| 2005/0105507 | A1 * | 5/2005 | Clements et al. ............ 370/351 |
| 2005/0111536 | A1 * | 5/2005 | Cranford et al. ............ 375/226 |

OTHER PUBLICATIONS

Benso A., Di Carlo S., Di Natale G., Prineto, P., Online Self-Repair of FIR filters, May-Jun. 2003, Design & Test of Computers, IEEE.*

(Continued)

*Primary Examiner*—David C Payne
*Assistant Examiner*—Tanmay K Shah
(74) *Attorney, Agent, or Firm*—Knobbe Martens Olson & Bear LLP (57) ABSTRACT

A relatively high-speed serial data transmitter incorporates built in self test (BIST). The BIST circuit advantageously provides tests modes to obviate the need to build expensive test equipment for high-speed serial data devices, such as a serializer/deserializer (SerDes) or other transceivers. Multiple data paths in a finite impulse response (FIR) filter of transmitter of the SerDes or a transceiver can be independently tested. The transmitter output can also be selectively degraded to test a receiver of a transceiver. An attenuated output signal can be provided to test receiver sensitivity. A low-pass filter can be invoked to emulate a backplane, while a loopback circuit can provide the emulated backplane attenuation to the receiver to permit testing of the equalization circuitry of a receiver without requiring the presence of an actual backplane for testing.

28 Claims, 8 Drawing Sheets

OTHER PUBLICATIONS

U.S. Appl. No. 10/193,131, Desandoli, et al.
U.S. Appl. No. 11/005,465, Hissen, et al.
Fiedler, et al., *A 1.0625 Gbps Transceiver with 2x-Oversampling and Transmit Signal Pre-Emphasis*, 1997 IEEE International Solid-State Circuits Conference: Digest of Technical Papers, pp. 238-239.
Gagnon, et al., *Optical Communication Channel Test Using BIST Approaches*, IEEE International Test Conference Proceedings 1997, pp. 626-635.
Laquai, et al., *Testing Gigabit Multilane SerDes Interfaces with Passive Jitter Injection Filters*, IEEE International Test Conference Proceedings 2001, pp. 297-304.

* cited by examiner

*PRIOR ART*

BUILT IN SELF TEST (BIST) FOR HIGH-SPEED SERIAL TRANSCEIVERS

RELATED APPLICATION

This application claims the benefit under 35 U.S.C. §119 (e) of U.S. Provisional Application No. 60/525,170, filed Nov. 26, 2003, the entirety of which is hereby incorporated by reference.

BACKGROUND

1. Field of the Invention

The invention generally relates to circuits and methods for built-in self tests (BISTs).

2. Description of the Related Art

Intra-system digital data transmission techniques over backplanes and other transmission mediums have migrated from the use of relatively wide data busses with many data lines to the use of high-speed serial links with relatively few data lines. The serial approach can provide the same or greater aggregate bandwidth while simplifying the backplane design by eliminating a great deal of routing congestion and the need for trace length matching.

Figure 1:
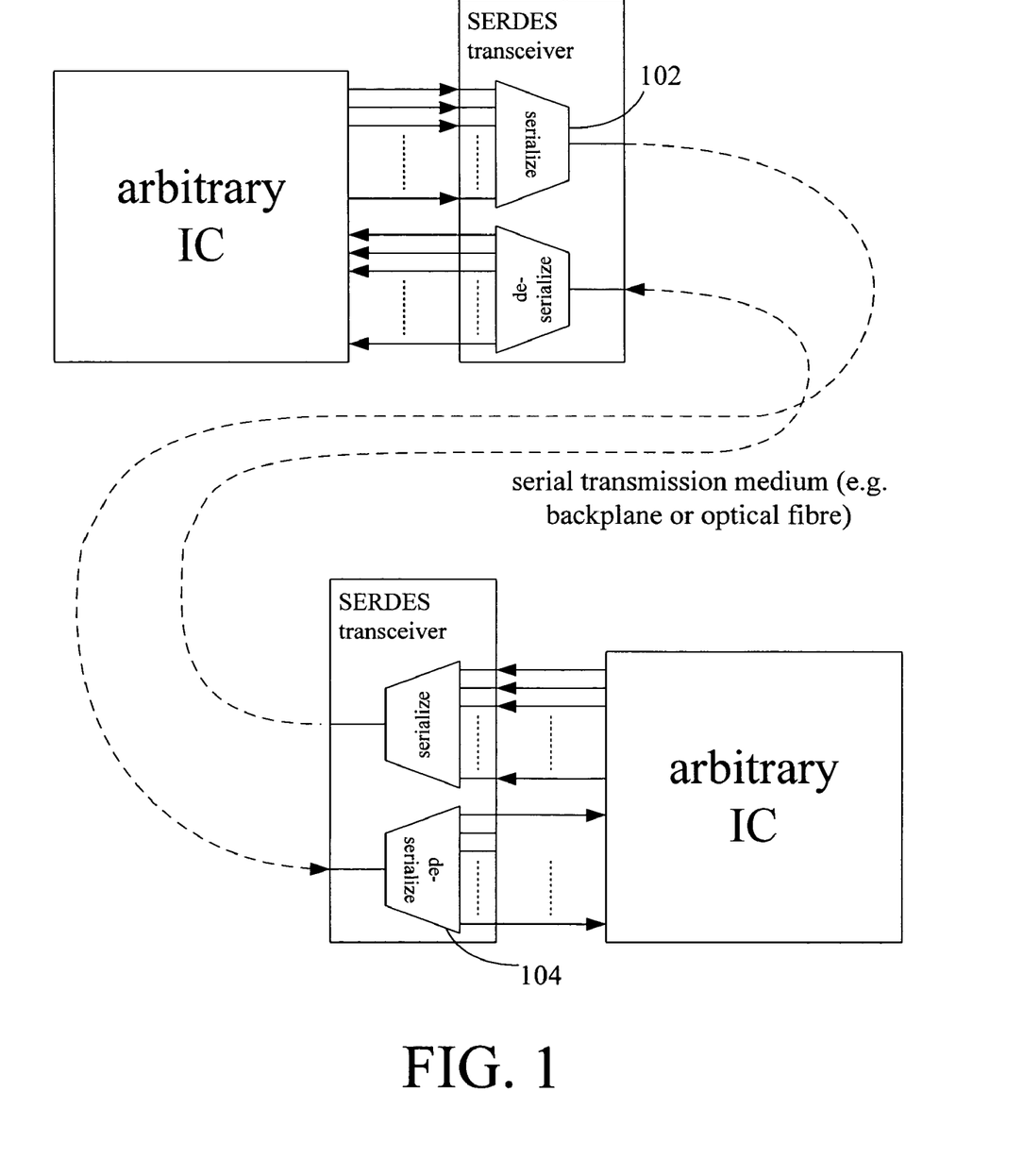
FIG. 1 illustrates an example of a serializer/deserializer (SerDes) application.

For example, as illustrated in FIG. 1, a common implementation uses a serializer 102 at the transmit end of a link to convert "wide" or parallel bus data into high-speed serial data, and uses a deserializer 104, at the receive end of the link to convert back to "wide" or parallel bus data for further processing. For full-duplex operation with unidirectional links, both serializer and deserializer operations can be provided at both ends of the backplane, and fully integrated serializer/deserializer (SerDes) devices are widely available from many integrated circuit (IC) vendors.

While simplifying some aspects of board or backplane design, the conversion to serial data transmission introduces significant signal integrity challenges. In some instances, data rates have approached or even exceeded the physical bandwidth limitations of backplane materials and construction methods.

Figure 2:
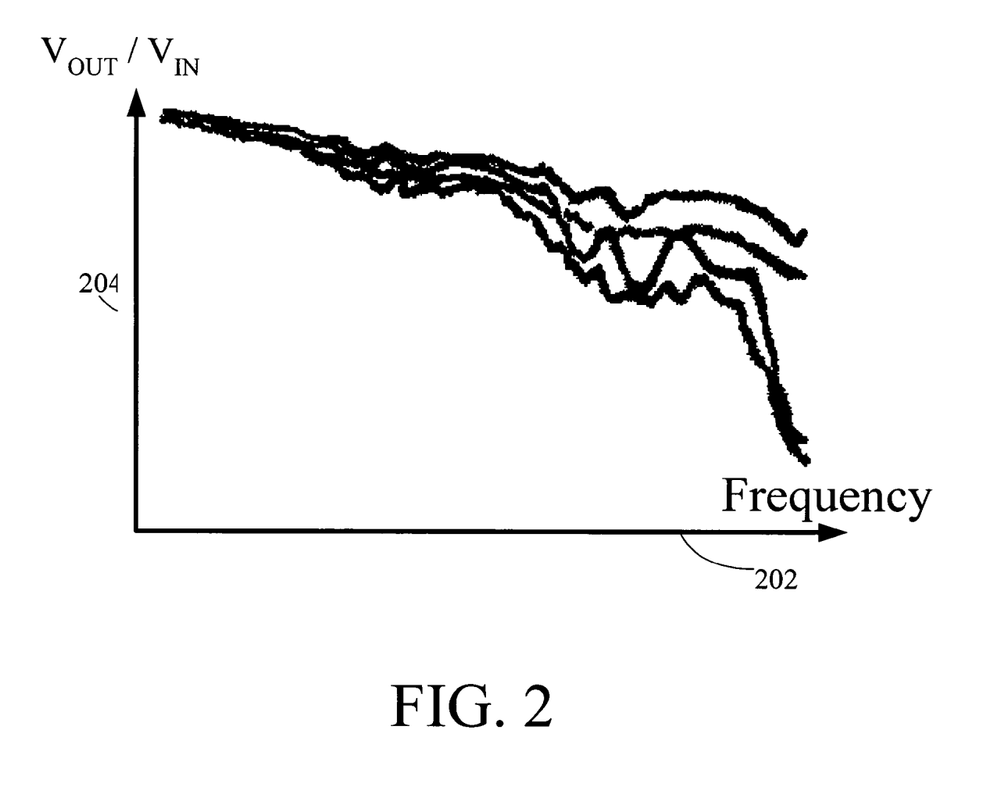
FIG. 2 illustrates examples of backplane transfer functions.
Figure 3A:
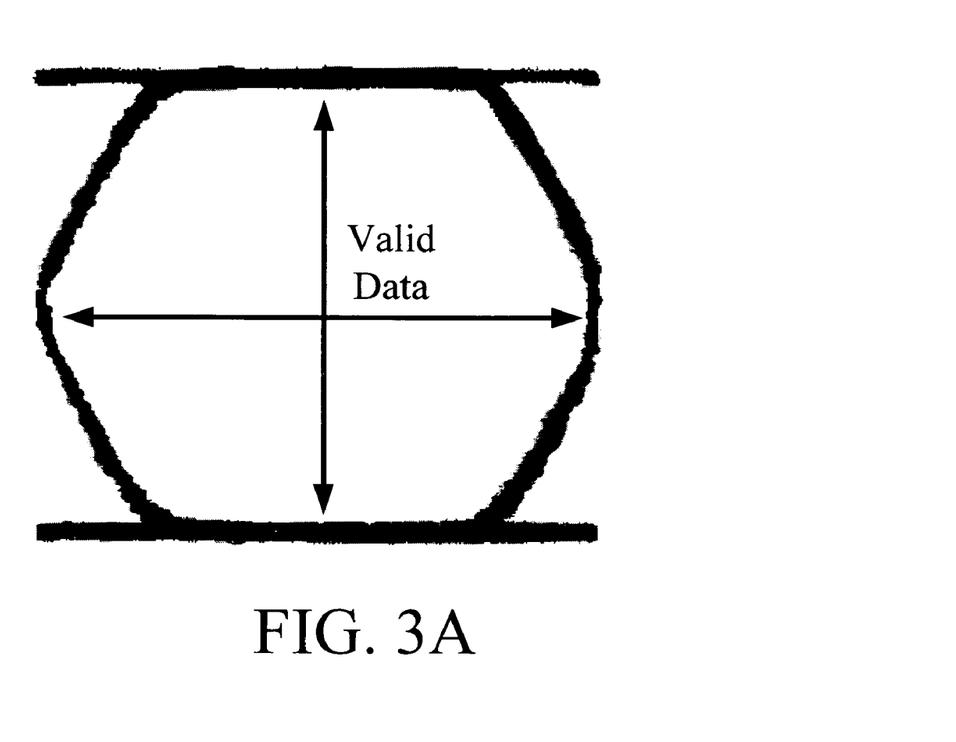
FIG. 3A illustrates a first example of a data "eye" representation of digital data transitions without bandwidth-limited transmission.
Figure 3B:
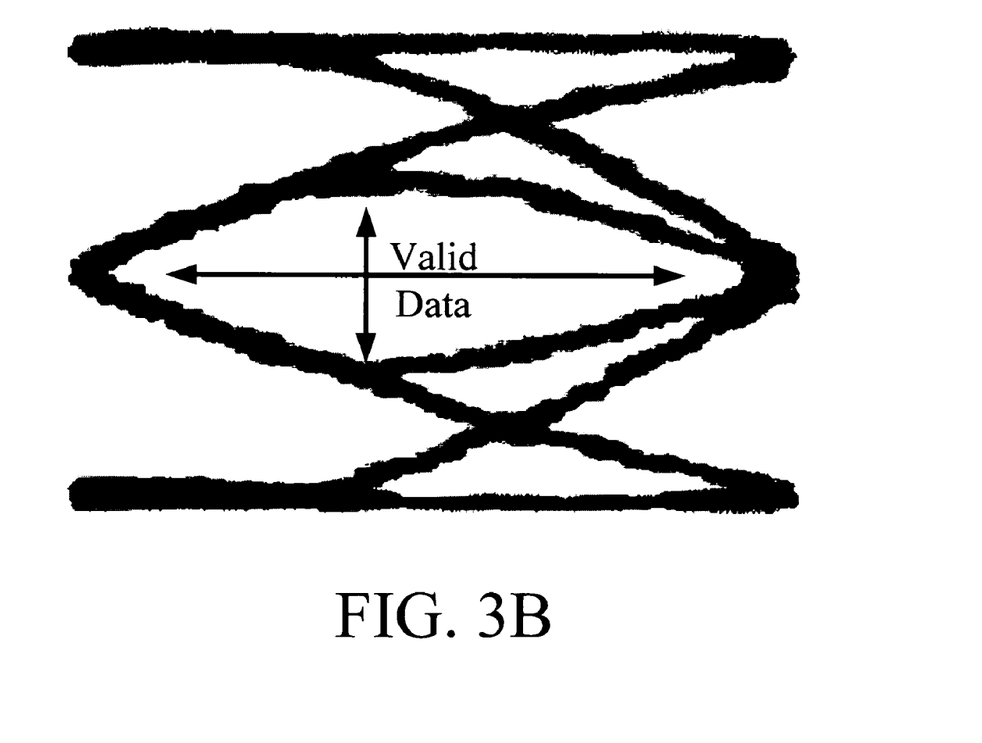
FIG. 3B illustrates a second example of a data eye representation of digital data transitions for bandwidth-limited transmission.

FIG. 2 illustrates examples of transfer functions of backplanes intended for high-speed digital data transmission. A horizontal axis 202 indicates frequency, with increasing frequency to the right. A ratio of voltage magnitude is indicated along a vertical axis 204. The transfer function of a transmission medium, such as a backplane, can adversely affect the quality of a signal carried therein. When the highest frequency component of the transmitted signal exceeds the bandwidth of the transmission medium, one readily observable result is signal distortion resulting in a reduced sampling window (known as the valid data "eye") at the receiver as illustrated by FIG. 3A and FIG. 3B.

A data eye corresponds to superimposed waveforms for binary bits of "0" and "1" within a bit period. FIG. 3A illustrates an example of a data eye corresponding to a relatively undistorted transmitted signal. FIG. 3B illustrates an example of a data eye for a transmitted signal that has been distorted by high frequency attenuation. For example, a backplane of limited bandwidth can induce the type of distortion observable in the data eye of FIG. 3B.

Present techniques to ameliorate the disadvantages of relatively low-bandwidth backplanes are inadequate. For example, the transmission medium itself can be changed to increase the roll-off frequency. This typically involves redesigning backplanes to take advantage of recent developments in materials that permit higher bandwidth transmission lines to be formed. Unfortunately, aside from the costs of redesigning boards, these new materials are significantly more expensive to use during manufacture, increasing cost of the overall system. In addition, the availability of high-performance high-bandwidth materials may not be able to keep pace with increases in demand for even higher data signaling rates in the future, so that a redesign of backplanes may not provide a dependable solution.

Another approach is to configure a SerDes transmitter to "pre-distort" the signal in a fashion that is notionally the inverse or complement of the distortion induced by the backplane. Thus, when the two effects are combined, the result presented to the receiver can closely approximate the originally-intended signal. A typical transmitter predistortion is to boost the high-frequency components of the signal, emphasizing the transitions in the data more than the logic-valid regions. This is commonly referred to as "pre-emphasis" of the data signal. The amount of pre-emphasis should be adjusted to match the characteristics of the intended transmission medium, so that making this feature programmable allows a given device to be used in a variety of systems.

Another approach is to configure the SerDes receiver to be better able to accommodate the reduced data eye opening. In this approach, some sort of front-end "equalization" is provided to the SerDes receiver so that the receiver includes a filter that approximates the inverse frequency response of the backplane. For example, a finite impulse response filter (FIR) can be used as an equalization circuit. Thus, the high-frequency components of the transmitted signal are first attenuated by the backplane, then boosted back up by the equalizer, prior to being sampled by the receiver. Once again, in order to be used in a variety of systems, a device will often incorporate some sort of programmability in its equalizer.

The demand for high-performance SerDes devices, particularly those including some form of pre-emphasis and/or equalization, is creating a unique challenge for integrated circuit (IC) vendors. While the underlying data communication protocols are fundamentally digital, the speed and waveform shaping capabilities use advanced analog design practices. Such "mixed-signal" ICs are typically challenging to test economically for a variety of reasons.

For purely digital devices, it is often sufficient to simply verify that all of the components and interconnects have been well formed, i.e., the device is structurally intact, without undue emphasis on functional performance. The fundamental components in purely digital circuits are operated in a region where they are relatively insensitive to small perturbations such as parametric variations in manufacturing. Such methods as scan-based automated test pattern generation (ATPG) are relatively simple and satisfactory methods for efficiently testing purely digital ICs.

High speed serializer/deserializer transceivers (SerDes) in general, and pre-emphasis and equalization in particular, are typically implemented with complicated analog or mixed-signal circuits. SerDes and other high-performance analog and mixed-signal devices are infrequently amenable to such techniques due to their relatively high sensitivity to small perturbations. Such circuits have proven to be impervious to systematic design-for-test (DFT) techniques, and adequate production test coverage is normally only possible with full-rate functional testing. In addition, it should be noted that the insertion of test structures itself may impact performance of the circuit to the point of preventing functionality. Furthermore, relatively small parametric variations in manufacturing, or passive defects that might not impact the performance of digital circuits, can cause catastrophic degradation in sensitive analog circuits.

One trustworthy method for reliably testing the very high-speed logic used on the serial side of a SerDes transceiver is to test the SerDes transceiver functionally at or beyond the rated performance of the device. This, however, is often not easily accomplished. Available automated test equipment (ATE) for IC production testing has been lagging the data rates of SerDes devices for the past several years such that the automated equipment that would be desirable in a production environment is often not available. This trend can be expected to continue provided that SerDes technology advances at approximately the same pace (or faster) than ATE technology.

Solutions with external SerDes test equipment wired into ATE fixtures, or fixture-mounted ATE channel multiplexing circuitry have been developed, but these solutions are clumsy and expensive, and are also inaccurate, unreliable, and do not scale to multi-link devices. Augmenting ATE equipment with external equipment such as bit error rate testers (BERTs) can serve as a workaround, but very quickly becomes prohibitively expensive and impossible to implement reliably for high link-count devices. For example, a 64-channel differential transceiver would use 64 BERT testers cabled together into the ATE test head, as well as include at least 256 high bandwidth single-pole double-throw relays on the test fixture for switching in ATE channels for DC parametric testing. The cost of the BERTs alone would dwarf even the most expensive digital ATE platforms currently commercially available, and experience has shown that the test fixture and cabling would be impractical to maintain during high volume manufacturing.

Another solution is to use loopback or loop-around testing, where the transmitter is either externally or internally connected to the receiver in test mode and used to provide functional data at-speed. For devices that incorporate a phase locked loop (PLL) that can frequency multiply a lower speed reference clock, and that also include on-board data generation and bit-error monitoring, this can provide significant test coverage with greatly reduced ATE performance.

Conventional loopback testing techniques have many limitations that can still result in a relatively high test escape rate. For example, a relatively good transmitter can compensate for a defective receiver, or vice-versa. In another example, programmable pre-emphasis and equalization parameters cannot be measured or stressed effectively with a fixed loopback transmission path. In some cases, operation using pre-emphasis and equalization is not even possible as a relatively short loopback path used for testing will typically have too high a bandwidth, resulting in over-compensated signals. Conversely, when the bandwidth of the loopback path is restricted, operation without pre-emphasis and equalization is not practical. Since many new SerDes devices support multiple pre-emphasis and equalization modes, at least some modes can disadvantageously remain incompletely tested by conventional tests, which risks missing the detection of failures.

For further background, see Fiedler, et al, *A 1.0625 Gbps Transceiver with 2×-Oversampling and Transmit Signal Pre-Emphasis,* 1997 IEEE International Solid-State Circuit Conference Digest of Technical Papers, pp. 238-239; Gagnon, Kaminska, *Optical Communication Channel Test Using BIST Approaches,* IEEE International Test Conference Proceedings 1997, pp. 626-635; and Laquai, et al., *Testing Gigabit Multilane SerDes Interfaces with Passive Jitter Injection Filters,* IEEE International Test Conference Proceedings 2001, pp. 297-304. Also see U.S. Pat. No. 5,386,590 to Dolan; U.S. Pat. No. 6,397,042 to Prentice, et al.; and U.S. Pat. No. 6,571,393 to Ko, et al, the disclosures of which are hereby incorporated by reference in their entireties.

SUMMARY

Embodiments include a relatively simple test-mode enhancement to pre-emphasis circuitry in a high-speed serial data transmitter that enables relatively comprehensive production test coverage of both the pre-emphasis circuitry on the transmitter and the equalization circuitry on a corresponding receiver to which the serial data is transmitted. In a transceiver, the receiver will typically be on the same device as the transmitter, i.e., a data transceiver, but it will be understood that the receiver and the transmitter can also be separate devices.

Because the test requires very little additional circuitry to the basic pre-emphasis block, and in one embodiment is implemented entirely on-chip, the test is advantageously highly scaleable, both to very high data rates and to very high link-count devices. Implementing the BIST circuit into a SerDes device provides a distinct advantage for production test, significantly increasing test coverage without the need to purchase additional expensive test equipment. A further advantage to incorporating BIST into a device is that even after the circuit has been installed in a customer's system, the BIST feature can continue to be used to test system margin by intentionally degrading the signal observed by the receiver until bit errors are observed.

One embodiment corresponds to a transmitter for a serial communications circuit that includes a test control circuit at least partially responsive to one or more signals in a test access port, where the test control circuit permits control of the transmitter between at least a normal mode and a first test mode; and a finite impulse response (FIR) filter circuit with a plurality of data paths including at least a primary data path and a first delayed data path, where a gain coefficient $G_1$ for the primary data path is configured to vary so that in a normal mode, the gain coefficient $G_1$ is non-zero and in the first test mode, the gain coefficient $G_1$ is zero.

One embodiment corresponds to a transmitter for a serial communications circuit that includes: a test control circuit at least partially responsive to one or more signals in a test access port, where the test control circuit selects control at least between a normal mode and a test mode; and a finite impulse response (FIR) filter circuit configured to receive a serial bitstream as an input, wherein the FIR filter circuit is in communication with the test control circuit for control, where in the normal mode, the FIR filter circuit is configured to other than a low-pass filter response, and where in the first test mode, the FIR filter circuit is configured to low-pass filter the serial bitstream.

One embodiment is a method of testing a Finite Impulse Response (FIR) filter of a high-speed serial data transmitter, where the method includes: providing a test signal to the FIR filter; selecting a data path for test, and for each data path in the FIR filter, performing: setting the coefficient associated with the selected data path to a non zero value; setting all other FIR filter coefficients to zero; monitoring an output of the data transmitter for the test signal; and determining that the selected data path is functioning when the test signal is detected at the output and is malfunctioning when the test signal is not detected at the output.

One embodiment is a method of testing a receiver sensitivity in a high-speed data transceiver, where the method includes: configuring an FIR filter of a transmitter to an attenuation characteristic; passing a test signal through the FIR filter thereby attenuating the test signal; operatively coupling a transmitter output with the attenuated test signal to a receiver input in a loopback arrangement; monitoring an output of the receiver for the test signal; and determining a test pass when the test signal is detected at the output of the receiver and a test fail when the test signal is not detected at the output of the receiver.

One embodiment is a method of testing a receiver equalization in a high-speed data transceiver, where the method includes: configuring an FIR filter of a transmitter to a low pass filter characteristic; passing a test signal through the FIR filter thereby low-pass filtering the test signal; operatively coupling a transmitter output with the attenuated test signal to a receiver input in a loopback arrangement; enabling an equalization circuit in the receiver; monitoring an output of the receiver for the test signal; and determining a test pass when the test signal is detected at the output of the receiver and a test fail when the test signal is not detected at the output of the receiver.

One embodiment includes an apparatus for testing a Finite Impulse Response (FIR) filter of a high-speed serial data transmitter, where the apparatus includes: means for providing a test signal to the FIR filter; means for selecting a data path for test, and for each data path in the FIR filter, performing: means for setting the coefficient associated with the selected data path to a non zero value; means for setting all other FIR filter coefficients to zero; means for monitoring an output of the data transmitter for the test signal; and means for determining that the selected data path is functioning when the test signal is detected at the output and is malfunctioning when the test signal is not detected at the output.

One embodiment includes an apparatus for testing a receiver sensitivity in a high-speed data transceiver, where the apparatus includes: means for configuring an FIR filter of a transmitter to an attenuation characteristic; means for passing a test signal through the FIR filter thereby attenuating the test signal; means for operatively coupling a transmitter output with the attenuated test signal to a receiver input in a loopback arrangement; means for monitoring an output of the receiver for the test signal; and means for determining a test pass when the test signal is detected at the output of the receiver and a test fail when the test signal is not detected at the output of the receiver.

One embodiment includes an apparatus for testing a receiver equalization in a high-speed data transceiver, where the apparatus includes: means for configuring an FIR filter of a transmitter to a low pass filter characteristic; means for passing a test signal through the FIR filter thereby low-pass filtering the test signal; means for operatively coupling a transmitter output with the attenuated test signal to a receiver input in a loopback arrangement; means for enabling an equalization circuit in the receiver; means for monitoring an output of the receiver for the test signal; and means for determining a test pass when the test signal is detected at the output of the receiver and a test fail when the test signal is not detected at the output of the receiver.

One embodiment includes a technique of testing the integrity of a Finite Impulse Response (FIR) filter in a high-speed serial data transmitter. For example, the high-speed serial data transmitter can be part of a transceiver, such as part of a serializer-deserializer. In one embodiment, data paths within the FIR filter are independently tested. For example, all but one data path at a time can be disabled by selecting the gain of a data path, such as a filter tap, to zero. This advantageously unmasks defective data paths that otherwise may be missed during test. In one embodiment, the data path that remains enabled is set to a gain of 1 to facilitate testing, but it will be understood that other gain values, such as a fractional gain (attenuation) can also be used to verify the integrity of a data path.

One embodiment includes a technique of programming or selecting filter coefficients of an FIR filter intended in normal use to provide pre-emphasis or a high-pass filtering function. For example, the FIR filter can be programmed or configured during test as a low-pass filter. In one embodiment, this emulates the low-pass filter response of a backplane. In one embodiment, a variety of low-pass filtering functions emulating a variety of backplane or other transmission medium responses are emulated.

One embodiment includes a method for testing the margin of a system while an applicable circuit is available in the system. Rather than using loopback techniques in a test environment, test signals are sent through actual backplanes, harnesses, cables, and the like, of actual systems incorporating the communications devices with built in self test (BIST). For example, the transmitter of a first device can be placed in one or more test modes to test a corresponding receiver of a second device. System margin for receiver sensitivity, the receiver equalization, or both the receiver sensitivity and the receiver equalization can be tested. To test system margin for receiver sensitivity, the normal output amplitude of the transmitter can be reduced by, for example, adjusting the gain of one or more filter coefficients or by disabling one or more data paths. To test the system margin for equalization, a pre-emphasis can be disabled or a low-pass filtering can be invoked.

BRIEF DESCRIPTION OF THE DRAWINGS

These drawings and the associated description are provided to illustrate embodiments and are not intended to be limiting.

DETAILED DESCRIPTION OF EMBODIMENTS

Although particular embodiments are described herein, other embodiments, including embodiments that do not provide all of the benefits and features set forth herein, will be apparent to those of ordinary skill in the art.

The techniques disclosed herein are applicable to a wide variety of communications circuits with built-in self test (BIST). One embodiment is applicable to the built-in self test of an integrated circuit that has a high-speed serial transmitter incorporating programmable pre-emphasis, and a corresponding receiver incorporating equalization, such transmit/ receive pair being designed to operate over a bandwidth-limited transmission medium such as a stripline on a printed circuit board such as a backplane. It will be understood that the transmit/receive pair can be separate devices or can be integrated together.

Digital Filtering

One of ordinary skill in the art should have at least a cursory understanding of digital filter construction, in particular, a relatively common class known as finite impulse response (FIR) filters. See, for example, Oppenheim and Schafer, *Discrete Time Signal Processing,* 2nd Edition, (1999: Prentice Hall, Inc, NJ). FIR filters are a popular way to implement pre-emphasis in digital signals.

Figure 4:
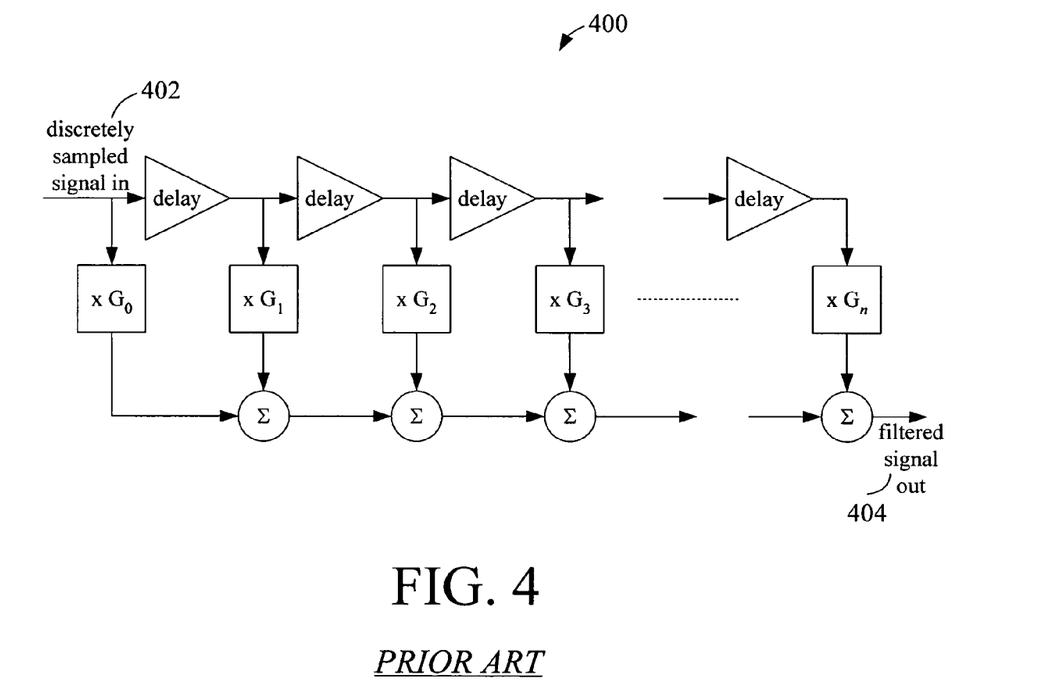
FIG. 4 illustrates a block diagram of an n-tap finite impulse response (FIR) filter.

As schematically illustrated in FIG. 4, one embodiment of an FIR filter 400 outputs the rolling weighted sum of a discretely sampled waveform 402 as a filtered signal output 404. In the illustrated example, the amount of the "delay" is equal to the input sample spacing, so that the filtered signal output 404 corresponds to the weighted sum of n+1 samples.

The weighting factors ($G_i$) and the range (n) over which to perform the selected weighting determine the response of the FIR filter 400. Virtually any desired filter response can be obtained. For example, a high-pass or a low-pass characteristics can be obtained from the same filter by changing the values of the coefficients or weighting factors ($G_i$).

Figure 5:
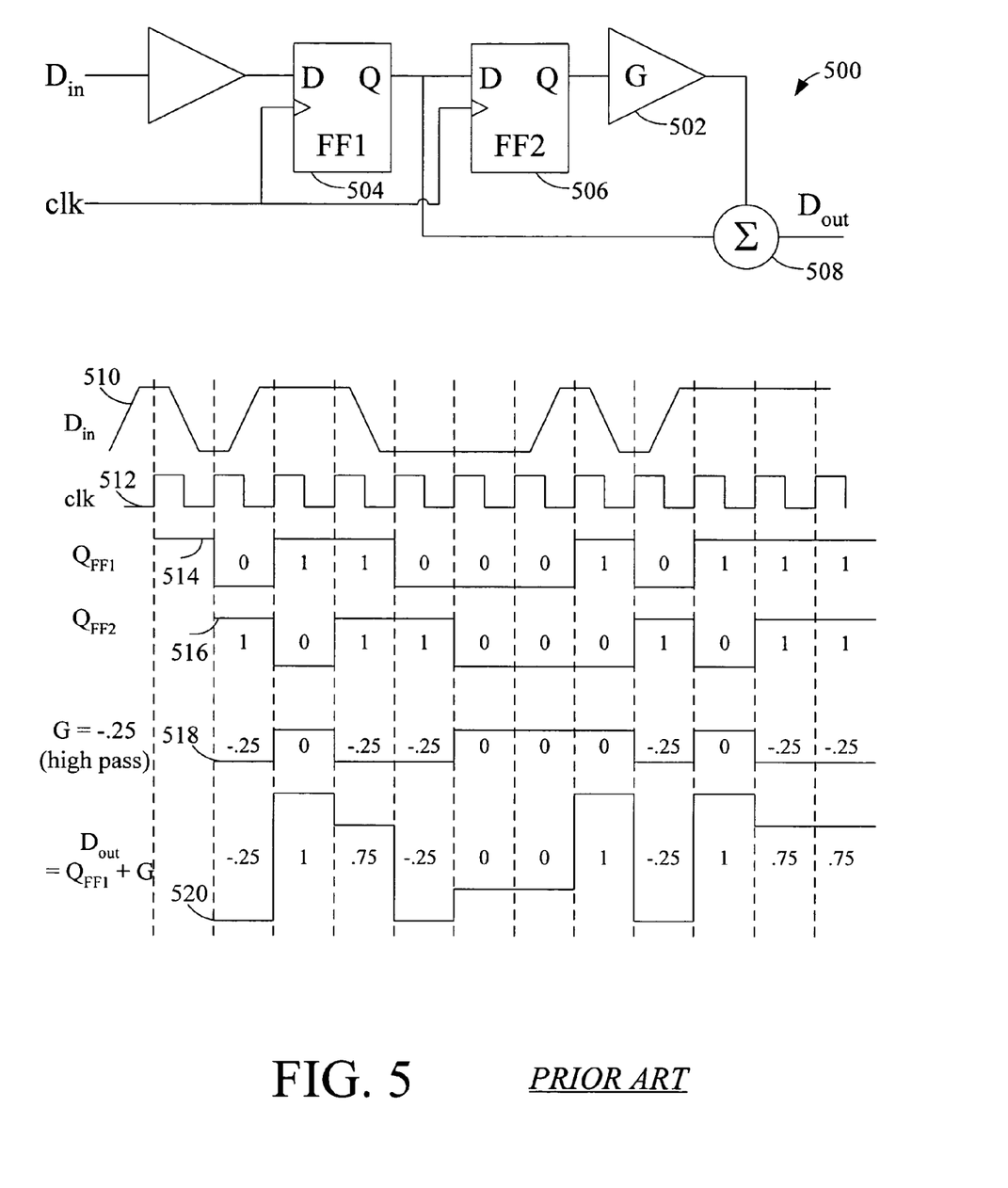
FIG. 5 illustrates an example of a single-delay tap FIR filter for implementing pre-emphasis in a communications device with fixed coefficients.

FIG. 5 illustrates a simple example of a 1-tap FIR filter 500 for a binary signal. A first waveform 510 corresponds to data input to the FIR filter 500. The data input can be provided by, for example, a one-bit analog-to-digital converter or a comparator. A second waveform 512 corresponds to a clock signal. A third waveform $Q_{FF1}$ 514 corresponds to an output of a first D-type flip flop 504. A fourth waveform $Q_{FF2}$ 516 corresponds to an output of a second D-type flip flop 506.

The illustrated FIR filter 500 is configured to provide pre-emphasis or a high-pass filter characteristic. When the gain stage G 502 is set to a value of negative 0.25 (−0.25), the FIR filter 500 exhibits a high-pass characteristic. In the illustrated embodiment, the gain stage G 502 corresponds to an analog circuit. It will be understood that other coefficients can also provide a high-pass filtering characteristic. In one embodiment, a negative coefficient for the FIR filter 500, such as −0.25, is implemented by using a positive tap coefficient and inserting an inverter (logically) prior to the gain stage G 502. It will be understood that in certain embodiments, an additional inverter is not actually necessary. For example, the second D-type flip flop 506 can have an inverted output available, the second D-type flip flop 506 can correspond to a differential logic circuit and the outputs can be swapped to invert the logical state, and the like. Advantageously, such an implementation is relatively easy to construct using digital logic. A fifth waveform 518 corresponds to an output of the gain stage G 502 with a gain of −0.25. An sixth waveform $D_{OUT}$ 520 corresponds to an output of a summing circuit 508 that provides the output of the FIR filter 400. As illustrated by the sixth waveform $D_{OUT}$ 520, the illustrated FIR filter with the tap coefficient set to −0.25 illustrates an example of the corresponding high-pass filtering characteristic.

Figure 6:
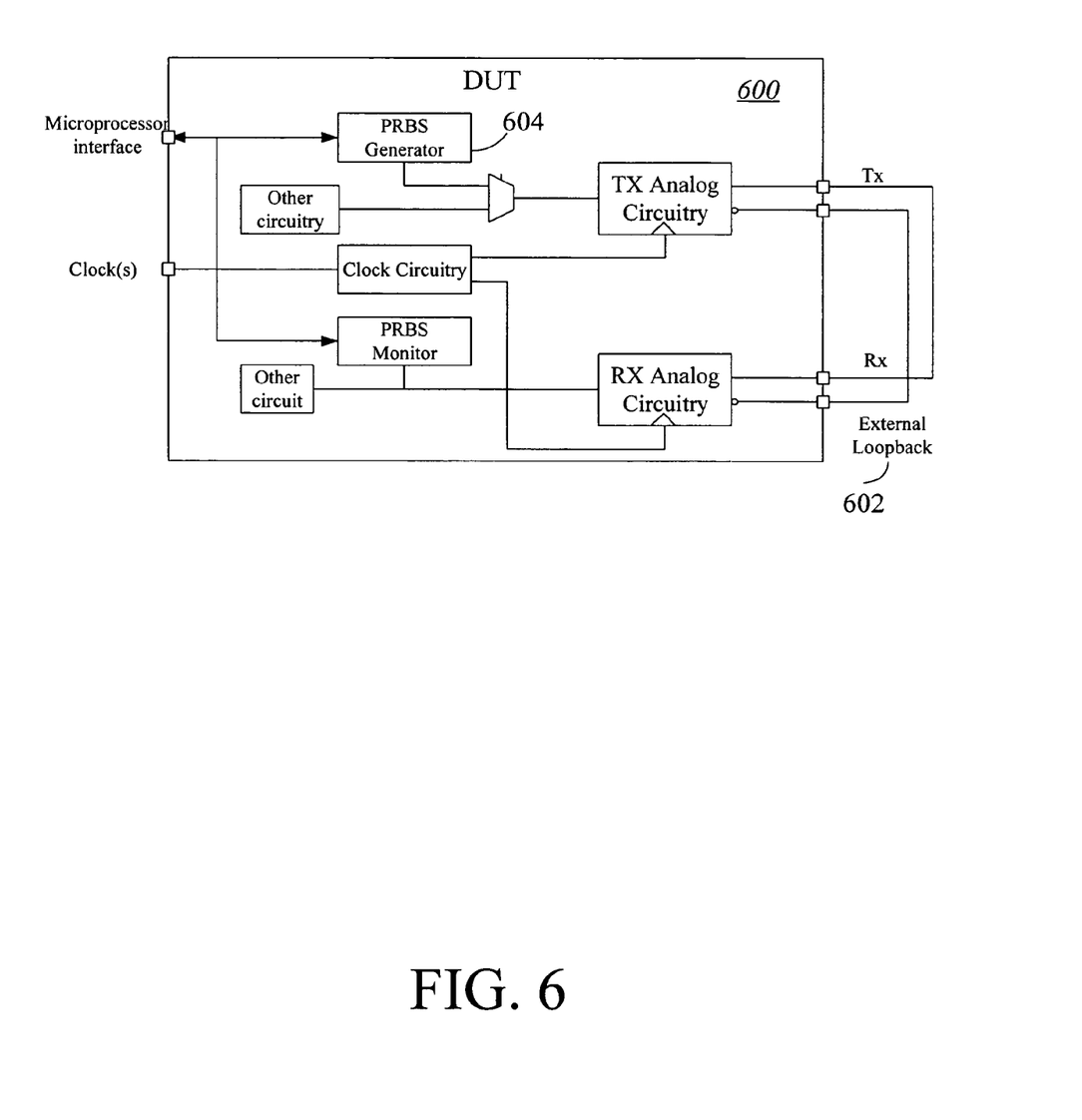
FIG. 6 illustrates loopback testing in the context of a communications device that includes a Pseudo-Random-Bit Sequence (PRBS) generator.

FIG. 6 illustrates an external loopback 602 used for a device under test (DUT) 600. In a built-in self-test (BIST) approach, some form of loopback testing is utilized, and the SerDes transmitter is coupled to the receiver and used to generate the required full-rate data stream. For example, the test data can be generated on the device itself from a test pattern generator, such as a Pseudo-Random Bit Sequence (PRBS) generator 604. It will be understood that a wide variety of test patterns can be used. Where the SerDes incorporates an on-chip phase locked loop (PLL) capable of frequency multiplication, the ATE can be relatively simple and relatively generic to a broad range of devices for test. In one example, an ATE is only required to provide low-speed configuration and error readback signals, along with a suitable low frequency reference clock as shown in FIG. 6. See, for example, U.S. Pat. No. 6,397,042 to Prentice, et al. Of course, it will be understood that the ATE can be equipped with additional features.

The device under test (DUT) 600 can be configured to operate in a normal mode (for its intended use) and at least one test mode. The test mode can be activated via a variety of techniques, such as signals on test pins, special commands sent on serial or parallel data lines, and the like.

BIST for Pre-Emphasis and Equalization Circuits of High Speed Serial Transceivers In one embodiment, the FIR filter of a transceiver with an FIR filter for pre-emphasis is configured to provide test-modes to one or more FIR filter taps. This advantageously promotes one or more of the following: testing of the FIR filter, emulation of a backplane, and generation of waveforms to stress the receiver of the transceiver.

Figure 7:
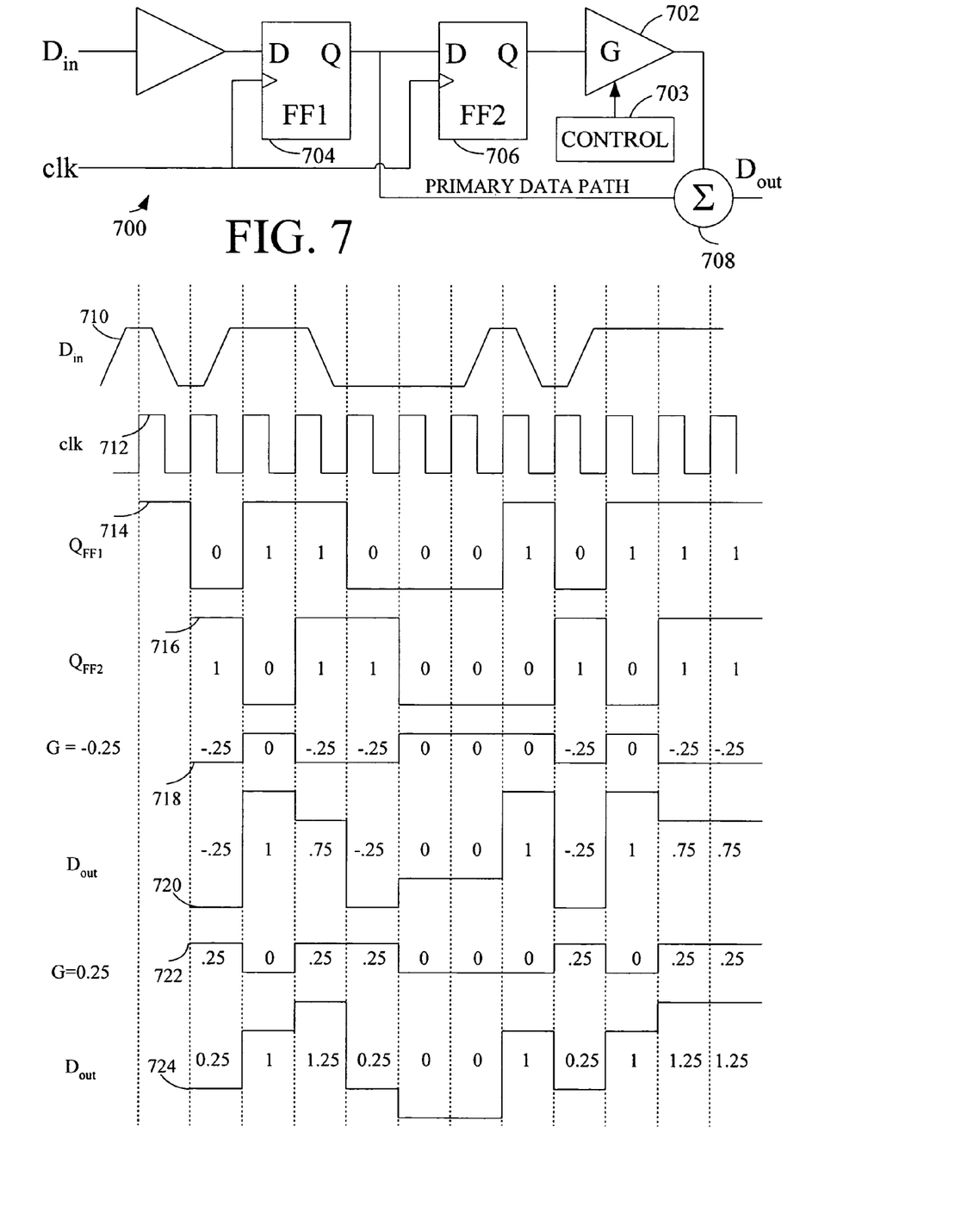
FIG. 7 illustrates an example of a single-delay tap FIR filter for a communications device with a controllable filter coefficient in the delay path.
Figure 8:
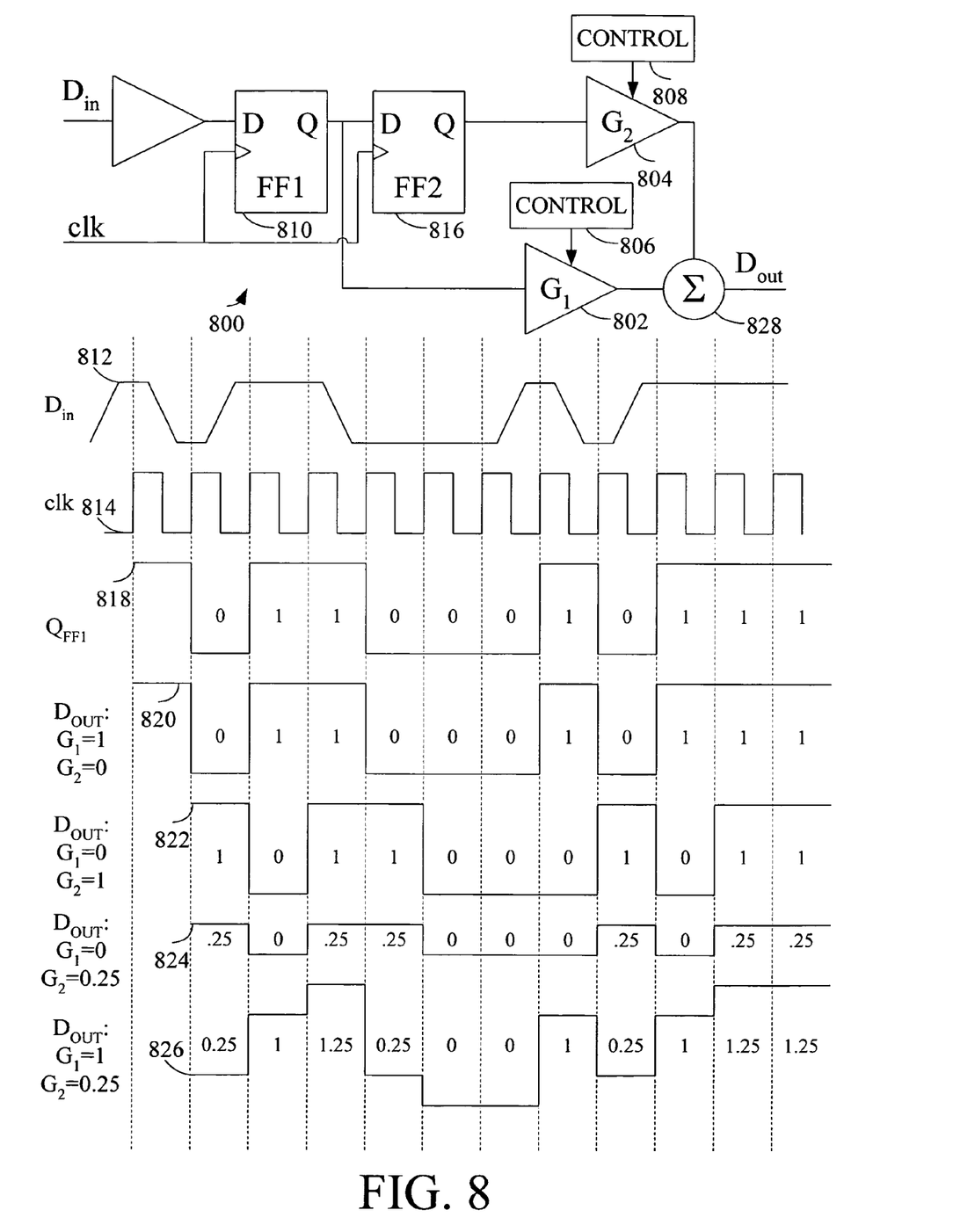
FIG. 8 illustrates an example of a single-delay tap FIR filter for a communications device with controllable filter coefficients in the primary path and in the delay path.

In one embodiment, the individual taps or filter coefficients of an FIR filter for pre-emphasis of the transceiver are tested by zeroing out or disabling all but one data path of the FIR filter at a time. In one example, a data path that is not zeroed out can be programmed or selected to have a filter coefficient of one. This permits each data path to be checked by the receiver. By testing each data path individually, the high-speed paths through the FIR filter can be fully verified. For example, when no data is detected from a selectively enabled data path, the data path can be determined to be inoperative. This prevents functioning data paths from masking defects in malfunctioning data paths. In one example, the data paths include filter taps that are delayed from the primary data path, as well as the primary data path. It will be understood that even though the primary data path can also include a delay as illustrated in FIGS. 7 and 8, the primary path is not considered "delayed" within the context of the FIR filter itself.

In one embodiment, one or more of the pre-emphasis filter data paths are independently controllable during test. For example, all the filter data paths can be independently controllable. In one embodiment, the FIR filter of the transceiver is configured to permit a more diverse range of filter coefficients for the data paths to be specified than anticipated for the intended environment of the transceiver. In one embodiment, the filter coefficients or tap values are programmable to configure the tap values of the FIR filter to provide emulation capabilities and/or stress test capabilities. These tap values can include positive, zero, and negative values and can be used in delayed paths and in the primary path.

In another embodiment, the tap values for BIST are selectable from values that are previously stored and available, such as in a memory, with the FIR filter. The more gain values and the higher the number of taps that are available for programming, the more adaptable the stress waveform construction is during test. For clarity, the principles and advantages described herein will be illustrated in the context of a single delayed tap on/off pre-emphasis as shown in FIG. 7 and FIG. 8.

In one embodiment, waveforms that emulate the low-pass characteristic of a backplane are generated by the revised filter coefficients of the FIR filter. Ordinarily, the FIR filter is intended to provide pre-emphasis to partially compensate for the low-pass characteristic of the backplane. By low-pass filtering the test waveforms and providing these waveforms as test signals to the receiver, the capability of the receiver equalizer to compensate for such bandwidth limiting can advantageously be tested via BIST.

FIG. 7 illustrates an example of a single-delay tap FIR filter 700 for a communications device, such as a SerDes, with a controllable filter coefficient in the delay path. FIG. 7 also illustrates associated waveforms. The filter coefficient of a gain stage G 702 can be controlled via a control 703, which changes the characteristic of the FIR filter. This permits configuration of the FIR filter specifically for BIST. For example, when in ordinary use, the FIR filter is configured to pre-emphasize the data signal or to provide no pre-emphasis. For example, for BIST purposes, the gain G can be controlled to provide a low-pass characteristic. For example, the control 703 can receive command signals from automated test equipment (ATE).

An output of a first D-type flip flop 704 corresponds to a primary path and is provided as an input to a summing circuit 708. The output of the first D-type flip flop 704 is also provided as an input to a second D-type flip flop 706. The output of the second D-type flip flop 706 corresponds to the first delayed tap of the FIR filter 700 and is provided as an input to the gain stage G 702. The filter coefficient or tap value of the gain stage G 702 is controllable, e.g., programmable, selectable, and the like, so that the same FIR filter 700 can provide both utility for pre-emphasis during use and also test waveforms for BIST. In one embodiment, the filter coefficient is selectable between a negative value used during operation, such as −0.25, and a value of zero (0) used for BIST and other situations when pre-emphasis is to be turned off. Other values are also useful in BIST, and will be described later in connection with FIG. 8. The value of zero advantageously "zeroes out" the corresponding tap, thereby permitting the primary path in the illustrated embodiment to be independently tested. However, the delay path through the second D-type flip flop 706 and the gain stage G 702 is not independently testable in the illustrated FIR filter 700.

Waveforms 710, 712, 714, 716, 718, 720 illustrate operation of the FIR filter 700. A first waveform $D_{IN}$ 710 corresponds to data input to the FIR filter 700. A second waveform 712 corresponds to a clock signal for delay timing through the flip-flops. A third waveform $Q_{FF1}$ 714 corresponds to the output of the first D-type flip flop 704. The third waveform $Q_{FF1}$ 714 also represents the output of the FIR filter 700, i.e., the output of the summing circuit 708, when the tap coefficient of the gain stage G 502 is set to zero.

A fourth waveform $Q_{FF2}$ 716 corresponds to the delayed (by one tap) output of the second D-type flip flop 706. The output of the second D-type flip flop 706 is provided as an input to the gain stage G 702. A fifth waveform 718 corresponds to an output of the first delayed tap with the filter coefficient of the gain stage G 702 set to −0.25. A sixth waveform $D_{OUT}$ 720 corresponds to the output of the summing circuit 708, which is the output of the FIR filter 700.

A seventh waveform 722 corresponds to the output of the first delayed tap with the filter coefficient of the gain stage G 702 set to +0.25. An eighth waveform $D_{OUT}$ 724 corresponds to the output of the summing circuit 708. As illustrated by the eighth waveform $D_{OUT}$ 724, with the filter coefficient of the gain stage G 702 set to +0.25, a low-pass filtered waveform results, which emulates the low-pass filtering of backplanes and other transmission mediums. It will be understood that the FIR filter can include additional delay taps, and that the coefficients of such delay taps can be a combination of values including positive values, negative values, or zero.

FIG. 8 illustrates an example of a single-delay tap FIR filter 800 for a communications device, such as a SerDes, with controllable filter coefficients in the primary path and in a delay path. FIG. 8 also illustrates associated waveforms. Advantageously, the controllable filter coefficients permit the FIR filter 800 to be specifically configured for BIST.

The illustrated FIR filter 800 includes a first gain stage $G_1$ 802 and a second gain stage $G_2$ 804. A first gain control 806 and a second gain control 808 are coupled to the first gain stage $G_1$ 802 and the second gain stage $G_2$ 804, respectively, and control the gain thereof. In the one embodiment, all of the gain stages, e.g., $G_1$ 802 and $G_2$ 804 in illustrated embodiment, are controllable. This permits each data path through the FIR filter 800 to be independently tested by, for example, setting the gain stages of all data paths to zero except for one, and using a filter coefficient such as 1 for the non-zeroed data path. Of course, other values can be used. In addition, it will be understood that the principles and advantages described herein will be applicable to FIR filters with more than one delay stage.

A first D-type flip flop 810 receives data input to the FIR filter 800. The data input is represented by an input waveform $D_{IN}$ 812. An output of the first D-type flip flop 810 corresponds to primary data path and for the purposes of the FIR filter 800 is considered undelayed. The output of the first D-type flip flop 810 is provided as an input to a second D-type flip flop 816 and to the first gain stage $G_1$ 802.

A clock signal, represented by a second waveform 814, controls the timing of the first D-type flip flop 810 and the second D-type flip flop 816. A third waveform $Q_{FF1}$ 818 represents the output of the second D-type flip flop 816. A fourth waveform $D_{OUT}$ 820 represents the output of a summing circuit 828, which is the output of FIR filter 800, for gain $G_1=1$ and gain $G_2=0$, which corresponds to an all-pass or flat-response configuration. The summing circuit 828 combines the outputs of the first gain stage $G_1$ 802 and the second gain stage $G_2$ 804.

In the illustrated chart, the first gain control 806 has configured the gain of the first gain stage $G_1$ 802 to be equal to 1 and the second gain control 808 has set the gain of the second gain stage $G_2$ 808 to be equal to 0, so that the output of the first gain control 806 and the output of the summing circuit 828 (and the FIR filter 800) are the same as the output of the first D-type flip flop 810. This permits testing of the primary data path. As will be described later, when other taps are to be tested for functionality, the first gain control 806 can set the gain of the first gain stage $G_1$ 802 to zero, such that other data paths can be independently tested.

A fifth waveform $D_{OUT}$ 822 represents the output of the summing circuit 828 (and the FIR filter 800) for gain $G_1=0$ and gain $G_2=1$, which is also an all-pass configuration. This permits testing of the data path associated with the first tap. It will be understood that if other taps are present, the other taps should be set to 0 as well to permit the independent testing of data paths.

A sixth waveform $D_{OUT}$ 824 corresponds to the output of the summing circuit 828 (and the FIR filter 800) for gain $G_1=0$ and gain $G_2=0.25$, which is also an all-pass configuration with attenuation. As illustrated, the sixth waveform $D_{OUT}$ 824 is attenuated in amplitude, which can be used as a stress test to test the sensitivity of the receiver.

A seventh waveform $D_{OUT}$ 826 corresponds to the output of the summing circuit 828 (and the FIR filter 800) for gain $G_1=1$ and gain $G_2=0.25$. The output of the second D-type flip flop 816 is provided as an input to the second gain stage $G_2$ 804. In the chart of FIG. 8, the second gain control 808 has set the gain of the second gain stage $G_2$ 804 to 0.25. This provides a low-pass filter function, which is not typically used in a communications device, such as a SerDes, during normal operation. As drawn, with a filter coefficient for the second gain stage $G_2$ 804 of 0.25, the resulting seventh waveform $D_{OUT}$ 826 is low-pass filtered from the input waveform $D_{IN}$ 812. This low-pass filtered waveform advantageously emulates the low-pass attenuation of a backplane, thereby simulating real world signal attenuation effects for adequate testing of equalization circuitry of the receiver of a transceiver of a communications device, such as a SerDes. Of course, other positive values for the filter coefficient for the second gain stage $G_2$ 804 will also provide a low-pass filtering characteristic for the FIR filter. In one embodiment, the second gain control 808 inverts the gain of the second gain stage $G_2$ 804 to change the characteristic of the FIR filter 800 from a high-pass filter for normal use to a low-pass filter for BIST. For example, the gain can be inverted from −0.25 to 0.25. In one embodiment, the gain can further be adjusted to a value of 1 for testing of the data path itself.

In the illustrated embodiment, the gain of both the first gain stage $G_1$ 802 and the second gain stage $G_2$ 804 are controllable. This also permits the primary delay path through the first gain stage $G_1$ 802 to be zeroed out to test the data path through the second gain stage $G_2$ 804 and vice versa. With other data paths zeroed out, the remaining data path can be set to a variety of values. For example, with a relatively low value, such as 0.25, the attenuation provided can advantageously be used to test the sensitivity of the receiver. It will be apparent that this approach of independently testing the data paths of an FIR filter can be extended to FIR filters of greater length (more taps).

Table 1 summarizes test coverage for selected test modes and provides an example of applicable gain settings.

TABLE 1

Simple Pre-emphasis Enhanced Test Modes

| | $G_1$ | $G_2$ | $D_{OUT}$ | Test Coverage |
|---|---|---|---|---|
| standard implementation | +1 | 0 | same as $D_{IN}$ (pre-emphasis off) | main data path |
| | +1 | −0.25 | high-pass $D_{IN}$ (pre-emphasis on) | pre-emphasis functionality |
| Example of enhanced testability | 0 | −0.25 | attenuated, inverted, 1 cycle delayed $D_{IN}$ | pre-emphasis data path/receiver sensitivity |
| | +1 | +0.25 | low-pass $D_{IN}$ | receiver equalization |
| | 0 | +1 (optional) | 1 cycle delayed $D_{IN}$ | pre-emphasis data path |

As illustrated in Table 1, the setting of a gain stage to zero permits independent testing of another data path. In one embodiment, the provision of setting the second gain stage $G_2$ 804 to a unity gain during test is optional.

In one embodiment, where programmable pre-emphasis has been implemented using a multi-tap FIR filter, and relatively high-resolution independently programmable gain buffers are used for each tap, additional transfer functions can be specified to stress receiver equalizer functionality at various operating points. For example, an adaptive equalizer can be tested to confirm that it will lock properly for a wide variety of emulated backplane waveforms and various signal amplitudes.

While the signal degradation feature of the BIST circuit has been described in the context of testing the receiver equalization integrated into the transceiver device, the signal degradation can also be used to perform system-level margin testing. In this case, the transmitter communicates with the receiver of another device over a true backplane or other transmission medium. The transmitter waveforms can then be degraded to further stress the downstream device until bit errors are observed. For example, the gain can be reduced to test the available margin for receiver sensitivity of the downstream device. In another example, low-pass filtering can be invoked to test the available margin for receiver equalization. If the downstream device cannot tolerate significant degradation, then the system can be determined to be marginal, and maintenance can advantageously be performed before the system fails thereby increasing long-term reliability.

Further advantageously, where the filter coefficients of the FIR filter are programmable, the backplane emulation capability can be adapted to a very broad variety of backplanes and even to backplanes and other transmission mediums that have yet to be developed.

The transmitter pre-emphasis block of another embodiment incorporates the ability to disable the primary data path, by, for example, setting the associated filter coefficient to zero. In a single delay tap filter, this permits only the data in the pre-emphasis data path to propagate to the output. This allows the pre-emphasis data path to be tested for defects independently of the primary data path. Of course, where additional taps are present, the other taps can also be disabled as well to provide independent testing of data paths.

One embodiment supports both test modes. Also, if the functional pre-emphasis requirements of the device design warrants use of a multi-tap FIR (as opposed to the single-tap implementation used in the preceding examples) additional filter coefficient gain values for each tap can provide more precise tuning of the transfer characteristic to match various realistic backplanes during production test. It will be understood that applicable values depend on the desired characteristics; there is a large body of established work on calculating FIR tap gain coefficients to obtain a specified transfer function.

Various embodiments have been described above. Although described with reference to these specific embodiments, the descriptions are intended to be illustrative and are not intended to be limiting. Various modifications and applications may occur to those familiar with the subject without departing from the true spirit and scope of the invention as defined in the appended claims.

What is claimed is:

1. A transmitter for a transceiver comprising:
   a test control circuit for the transmitter of the transceiver, wherein the test control circuit is at least partially responsive to one or more signals in a test access port, where the test control circuit permits control of the transmitter between at least a normal mode and a first built-in self test mode for the transmitter; and
   a finite impulse response (FIR) filter circuit of the transmitter of the transceiver, the FIR filter circuit having a plurality of data paths including at least a primary data path and a first delayed data path, where a gain coefficient $G_1$ for the primary data path is configured to vary so that in a normal mode, the gain coefficient $G_1$ is non-zero and in the first built-in self test mode, the gain coefficient $G_1$ is zero;
   wherein the first built-in self test mode is one of a plurality of built-in self test modes, wherein in each built-in self test mode of the plurality, a gain coefficient for only one particular delay path corresponding to the test mode is set to a non-zero value, and all other gain coefficients for other data paths of the FIR filter circuit are set to zero, wherein the plurality of built-in self test modes covers each of the data paths of the FIR filter circuit such that each data path of the FIR filter circuit can be individually verified.

2. The transmitter as defined in claim 1, wherein the non-zero value for the built-in self test mode corresponds to one.

3. A transmitter for a transceiver comprising:
a test control circuit for the transmitter of the transceiver, wherein the test control circuit is at least partially responsive to one or more signals in a test access port, where the test control circuit permits control of the transmitter between at least a normal mode and a first built-in self test mode for the transmitter; and
a finite impulse response (FIR) filter circuit of the transmitter of the transceiver, the FIR filter circuit having a plurality of data paths including at least a primary data path and a first delayed data path, where a gain coefficient $G_1$ for the primary data path is configured to vary so that in a normal mode, the gain coefficient $G_1$ is non-zero and in the first built-in self test mode, the gain coefficient $G_1$ is zero;
wherein the first built-in self test mode is one of a plurality of built-in self test modes, where in each built-in self test mode of the plurality, a gain coefficient for only one particular delay path corresponding to the test mode is set to a non-zero value, and all other gain coefficients for other data paths of the FIR filter circuit are set to zero;
wherein a non-zero value for the built-in self test mode corresponds to less than one, such that an output signal of the transmitter is attenuated from an input signal and is looped back to an input of a receiver of the transceiver to generate a signal for built-in self test of sensitivity of the receiver.

4. A transmitter for a transceiver comprising:
a test control circuit for the transmitter of the transceiver, wherein the test control circuit is at least partially responsive to one or more signals in a test access port, where the test control circuit permits control of the transmitter between at least a normal mode and a first built-in self test mode for the transmitter; and
a finite impulse response (FIR) filter circuit of the transmitter of the transceiver, the FIR filter circuit having a plurality of data paths including at least a primary data path and a first delayed data path, where a gain coefficient $G_1$ for the primary data path is configured to vary so that in a normal mode, the gain coefficient $G_1$ is non-zero and in the first built-in self test mode, the gain coefficient $G_1$ is zero;
wherein in the first built-in self test mode, a second coefficient $G_2$ for the first delayed path is non-zero, further comprising a second built-in self test mode, where in the second built-in self test mode, the gain coefficient $G_1$ is non-zero and the second coefficient $G_2$ is zero.

5. The transmitter as defined in claim 1, wherein the FIR filter circuit further comprises a logic gate selected from the group consisting of an AND gate, an OR, a NAND gate, and a NOR gate to multiply the primary data path by the first gain $G_1$.

6. The transmitter as defined in claim 1, further comprising a parallel to serial converter circuit configured to receive data in a plurality of data bits and serialize the data to the serial bitstream.

7. The transmitter as defined in claim 6, wherein the parallel to serial converter circuit is embodied in a serializer/deserializer (SerDes) device.

8. A transmitter for a transceiver comprising:
a test control circuit for the transmitter of the transceiver at least partially responsive to one or more signals in a test access port, wherein the test control circuit selects control at least between a normal mode and a predetermined test mode for the transmitter; and
a finite impulse response (FIR) filter circuit of the transmitter, wherein the FIR filter circuit is configured to receive a serial bitstream as an input, wherein the FIR filter circuit is in communication with the test control circuit for control, wherein in the normal mode, the FIR filter circuit is configured to other than a low-pass filter response, and wherein in the predetermined test mode, the FIR filter circuit is configured to low-pass filter the serial bitstream in a predetermined fashion.

9. The transmitter as defined in claim 8, wherein in the normal mode, the FIR filter circuit is configured to a pre-emphasis frequency response or to a flat frequency response.

10. The transmitter circuit as defined in claim 8, wherein the FIR filter circuit as configured in the predetermined test mode emulates a predetermined low-pass filter transfer function of a backplane.

11. The transmitter circuit as defined in claim 8, further comprising a parallel to serial converter circuit configured to receive data in a plurality of data bits and serialize the data to the serial bitstream.

12. The transmitter circuit as defined in claim 11, wherein the parallel to serial converter circuit is embodied in a serializer/deserializer (SerDes) device.

13. A method of testing operability of a Finite Impulse Response (FIR) filter of a transmitter of a high-speed serial data transceiver using built-in self test, the method comprising:
providing a test signal to the FIR filter of the transmitter of the high-speed serial data transceiver;
selecting only one data path for test at a time, and for each data path in the FIR filter via the built-in self test, performing:
(i) setting the coefficient associated with the only one selected data path to a non-zero value;
(ii) setting all other FIR filter coefficients to zero;
(iii) monitoring an output of the data transmitter for the test signal;
(iv) determining that the selected data path is functioning when the test signal is detected at the output and is malfunctioning when the test signal is not detected at the output; and
repeating (i) to (iv) until all the data paths through the FIR filter can be fully verified.

14. The method as defined in claim 13, further comprising providing the test signal to the FIR filter at a full-rate specified for the high-speed serial data transmitter.

15. The method as defined in claim 13, wherein the non-zero value is one.

16. The method as defined in claim 13, further comprising providing the test signal as an input to the transmitter.

17. The method as defined in claim 13, further comprising internally generating the test signal with a test pattern generator.

18. The method as defined in claim 13, wherein the high-speed serial data transmitter is part of a serializer-deserializer (SerDes), further comprising providing the test signal as a parallel input to a low-speed parallel input of the SerDes.

19. The method as defined in claim 18, further comprising:
operatively coupling the output of the data transmitter to a receiver of the SerDes; and
monitoring the output at a parallel output of the SerDes.

20. A method of testing a receiver sensitivity in a high-speed data transceiver using built-in self test, the method comprising:
configuring an FIR filter of a transmitter of the high-speed data transceiver to an attenuation characteristic via the built-in self test, wherein the FIR filter has at least a first gain characteristic and a second gain characteristic, wherein the first gain characteristic is for normal operation and the second gain characteristic is for built-in self test, wherein the second gain characteristic is deliberately lower than the first gain characteristic;

passing a test signal through the FIR filter thereby attenuating the test signal;

operatively coupling a transmitter output with the attenuated test signal to a receiver input in a loopback arrangement, wherein the transmitter of the high-speed data transceiver is connected to the receiver of the high-speed data transceiver;

monitoring an output of the receiver of the high-speed data transceiver for the test signal; and determining a test pass when the test signal is detected at the output of the receiver and a test fail when the test signal is not detected at the output of the receiver.

21. The method as defined in claim 20, further comprising providing the test signal at a full-rate specified for the high-speed data transceiver.

22. The method as defined in claim 20, wherein the high-speed data transceiver is part of a serializer-deserializer (SerDes), further comprising providing the test signal as a parallel input to a low-speed parallel input of the SerDes.

23. The method as defined in claim 22, further comprising:
operatively coupling the output of the data transmitter to a receiver of the SerDes; and
monitoring the output at a parallel output of the SerDes.

24. A method of testing a receiver equalization in a high-speed data transceiver using built-in self test, the method comprising:

configuring an FIR filter of a transmitter of the high-speed data transceiver to a low-pass filter characteristic via the built-in self test;

passing a test signal through the FIR filter thereby low-pass filtering the test signal;

operatively coupling a transmitter output with the attenuated test signal to a receiver input in a loopback arrangement;

enabling an equalization circuit in the receiver;

monitoring an output of the receiver of the high-speed data transceiver for the test signal; and determining a test pass when the test signal is detected at the output of the receiver and a test fail when the test signal is not detected at the output of the receiver.

25. The method as defined in claim 24, further comprising providing the test signal at a full-rate specified for the high-speed data transceiver.

26. The method as defined in claim 24, wherein the high-speed data transceiver is part of a serializer-deserializer (SerDes), further comprising providing the test signal as a parallel input to a low-speed parallel input of the SerDes.

27. The method as defined in claim 26, further comprising:
operatively coupling the output of the data transmitter to a receiver of the SerDes; and
monitoring the output at a parallel output of the SerDes.

28. The method as defined in claim 20, wherein the second gain is 12 decibels lower than the first gain.

* * * * *